United States Patent [19]

Heyes et al.

[11] Patent Number: 5,059,460
[45] Date of Patent: Oct. 22, 1991

[54] LAMINATED METAL SHEET

[75] Inventors: Peter J. Heyes, Wantage; Nicholas J. Middleton, Highworth, both of England

[73] Assignee: CMB Foodcan plc, Worcester, England

[21] Appl. No.: 378,201
[22] PCT Filed: Oct. 12, 1988
[86] PCT No.: PCT/GB88/00853
§ 371 Date: Jun. 9, 1989
§ 102(e) Date: Jun. 9, 1989
[87] PCT Pub. No.: WO89/03304
PCT Pub. Date: Apr. 20, 1989

[30] Foreign Application Priority Data

Oct. 15, 1987 [GB] United Kingdom ............ 8724238

[51] Int. Cl.$^5$ .................... B65D 1/00; B32B 15/08
[52] U.S. Cl. .................... 428/35.3; 156/308.2; 156/309.9; 428/35.9; 428/458; 428/480
[58] Field of Search .............. 428/458, 480, 35.9, 428/35.3; 156/308.2, 309.9

[56] References Cited

U.S. PATENT DOCUMENTS

| | | | |
|---|---|---|---|
| 2,861,022 | 11/1958 | Lundsager | 428/480 X |
| 4,362,775 | 12/1982 | Yabe et al. | 428/458 X |
| 4,493,872 | 1/1985 | Funderburk et al. | 428/458 X |

FOREIGN PATENT DOCUMENTS

| | | |
|---|---|---|
| 0062385 | 10/1982 | European Pat. Off. . |
| 0084827 | 8/1983 | European Pat. Off. . |
| 2216108 | 8/1974 | France . |
| 61-149340 | 7/1986 | Japan . |
| 759876 | 10/1956 | United Kingdom ........ 428/458 |
| 1501353 | 2/1978 | United Kingdom ........ 428/458 |
| 1566422 | 4/1980 | United Kingdom ........ 428/458 |
| 2055687 | 8/1983 | United Kingdom ........ 428/458 |
| 2123746 | 10/1986 | United Kingdom ........ 428/458 |
| 2164899 | 1/1988 | United Kingdom ........ 428/458 |

Primary Examiner—Thomas J. Herbert, Jr.
Attorney, Agent, or Firm—Burns, Doane, Swecker & Mathis

[57] ABSTRACT

A process for producing by simultaneous lamination a polymer/metal/polymer laminate, which process comprises (i) simultaneously laminating to each of the major surfaces of a metal sheet a composite polyester film (A) comprising an inner layer (A1) of a substantially non-crystalline linear polyester having a softening point (Ts-A1) below 200° C. and a melting point (Tm-A1) above 150° C. and below 250° C. and an outer layer (A2) of a biaxially oriented linear polyester having a crystallinity greater than 30% and having a melting point (Tm-A2) above 250° C., the metal sheet having been heated to a temperature $T_1$ above the softening point (Ts-A1), preferably above the melting point (Tm-A1), of the polyester of inner layer (A1) thereby to cause softening, preferably melting, of the inner layers (A1) and adhesion thereof to the metal sheet, but below the temperature (Tm-A2) at which the outer surface of the outer layer (A2) will melt when in contact with the metal strip at temperature $T_1$, and (ii) re-heating the resultant laminate to a temperature $T_2$ sufficient to cause the polymer films (A1) to interact with and become bound to the respective surface of the metal sheet, but such that the outer surface of the outer layer (A2) remains below temperature (Tm-A2). The laminates formed in accordance with the present invention are useful for forming into containers or various components thereof.

24 Claims, 3 Drawing Sheets

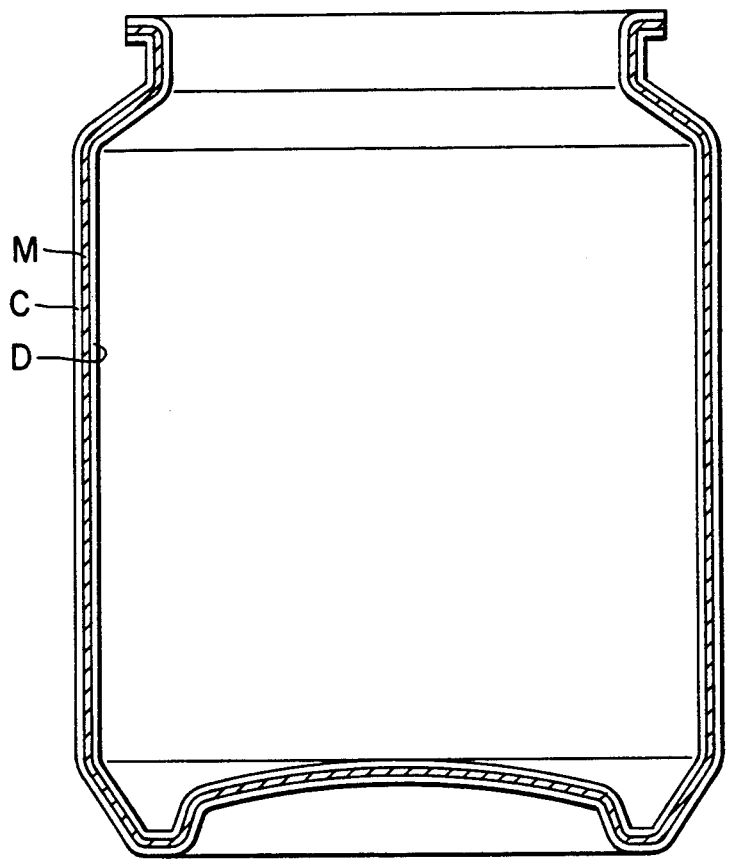

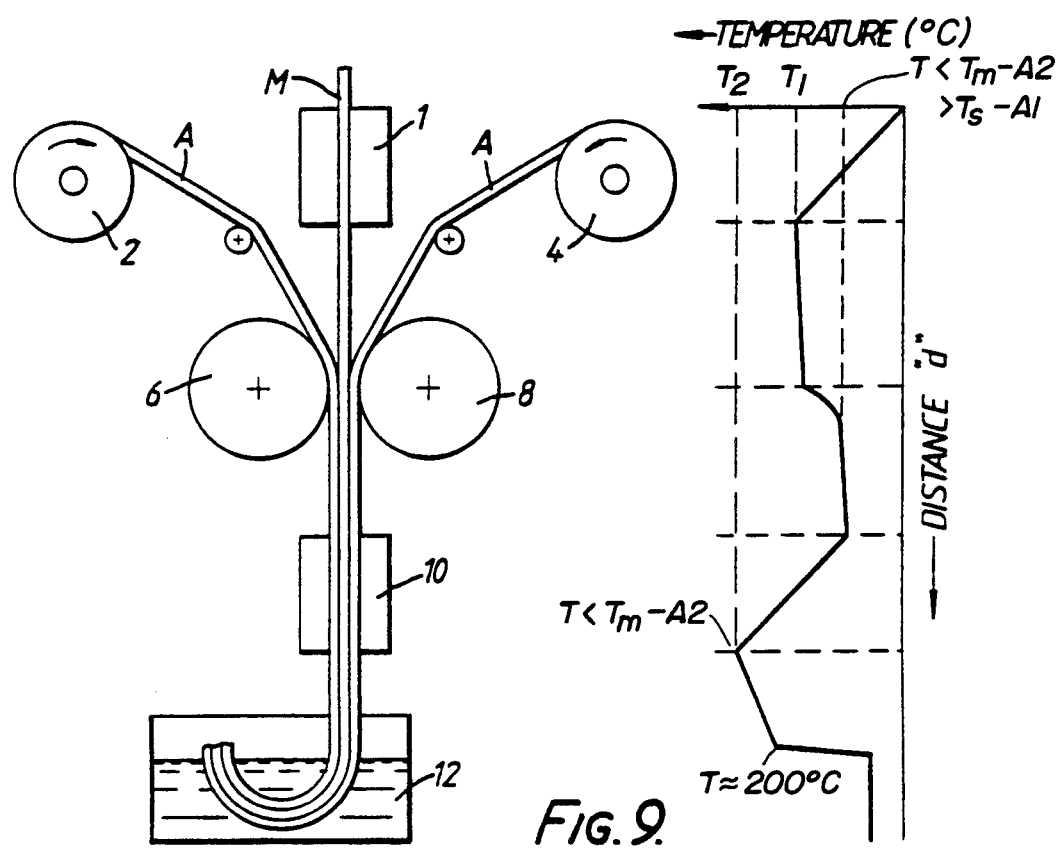
FIG.9.
FIG.11.
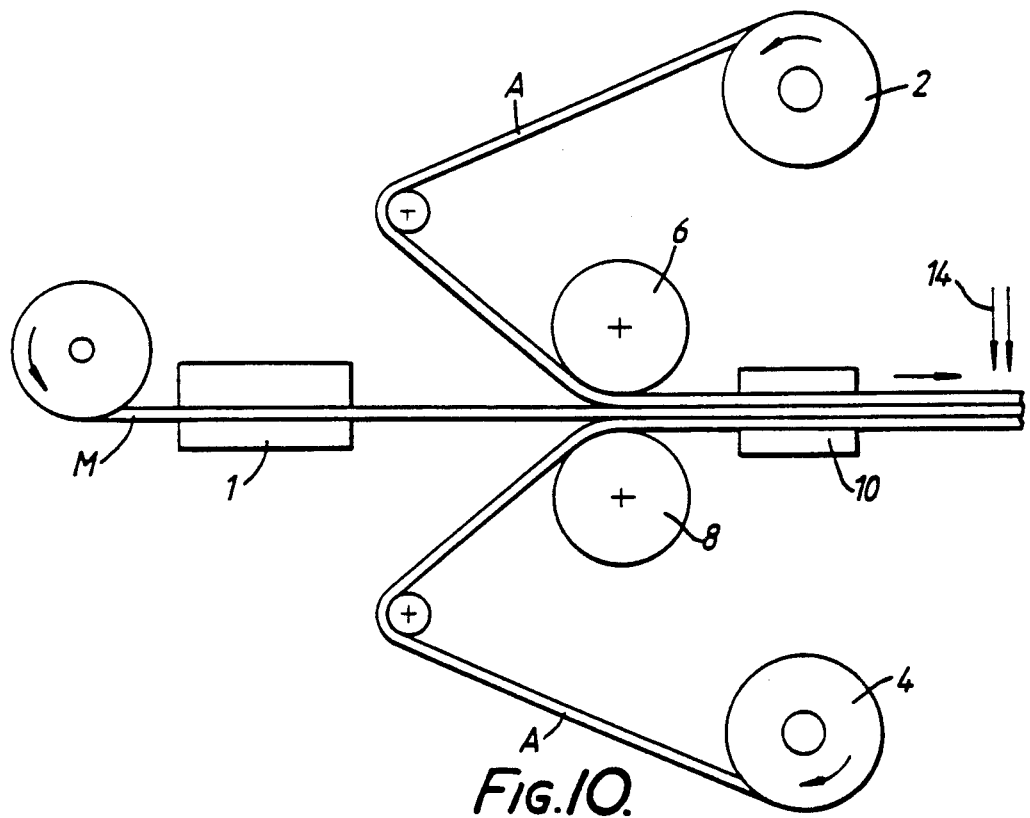
FIG.10.

LAMINATED METAL SHEET

The present invention relates to a process for producing a laminated metal sheet, and to laminated metal sheet Produced by such a process.

Lamination of polymer materials to metal sheet such as metal strip is a well known and well documented technique. The resultant laminates have many applications such as for example in the manufacture of can bodies and can ends for containers for foodstuffs and beverages, and aerosol containers.

Polyester coatings are frequently used to coat metal sheet in order to impart good corrosion resistance to the metal sheet. It is usual to try to coat the metal sheet with a polyester resin which has a crystalline and oriented structure since such polyester films have low permeability to oxygen, water and steam. However, it has been found that it is not easy to achieve adhesion of such crystalline, biaxially oriented polyester film to a metal sheet.

One solution to this problem is to laminate the biaxially oriented polyester to the metal sheet by use of processing conditions which require heating the metal sheet to high temperatures thereby to melt at least part of the biaxially oriented polyester. Such proposals are contained, for example, in GB 759876 and GB 2123746. However, while this solution has certain advantages, it relies on very close control of metal strip temperature during the lamination and lamination rolls of highly resistant materials for the very high temperatures necessary to laminate biaxially oriented polyethylene terephthalate film to metal strip.

An alternative solution is to provide an intermediate layer of adhesive between the crystalline polyester layer and the metal sheet to which that layer is to be adhered. This type of solution to the problem is disclosed, for example. in GB 2164899 which requires the application of an epoxy resin adhesive to the metal sheet for the application of a polyester resin tilm. This allows the lamination process to be performed at a lower lamination temperature but produces a coating with relatively poor formability in deep drawing operations and is a relatively expensive way of overcoming the said problems.

Similarly, GB 1501353 describes a blend of a polyester, an α-olefin copolymer and an epoxy compound for the purpose of formulating an adhesive suitable for use in laminating thermoplastic resins to a metal substrate. GB 2055687 describes a laminate formed by heat bonding a film of a biaxially oriented polyester film to a metal sheet by use of an adhesive layer, the adhesive layer being made of a polyblend which incorporates a high melting point polyester and a low melting point polyester. The blend of polyesters may incorporate a polyolefin resin.

None of the above-mentioned patents are concerned with the problems which arise in deep drawing cans from polyester-metal laminates.

Conventional adhesives can be used to bond metal sheet and film. For example, isocyanate-based adhesives may be coated onto the polyester film or metal sheet before the two are brought into contact in a lamination nip.

In practice, if one attempts to manufacture cans from laminates according to GB 2123746 and 2164899, typically by deep-drawing a disc of 189 mm diameter to a can of height 100 mm and diameter 65 mm (a size widely used in the canning industry), severe disruption of the polyester coating is observed leading to substantial loss of coverage of the metal by the coating. As a result the shelf life of the resultant container when packed with food products is found to be substantially reduced so that such containers are unacceptable from a commercial point of view. The coating disruption in deep drawing is a consequence of the forming process extending the laminated oriented film beyond its elongation limit, resulting in fracturing of the oriented polyester. This phenomenon affects oriented polyester coatings as described in GB 2123746 and 2164899 and those produced and laminated by other techniques in which attention is not paid to the coating's tensile properties.

Lamination of a polyester to a metal substrate is also described in GB 1566422. This patent specification indicates that the laminates described therein are suitable for deep drawing applications. However, the polyesters used to form the laminates described in GB 1566422 are polyesters of a very specific class in that they have an intrinsic viscosity of 1.2 to 1.8 and a crystallinity in the laminated film which is 30% or less. This specific class of polyester has an intrinsic viscosity range which is such as to exclude conventional, commercially available polyethylene terephthalate homopolymer materials such as the biaxially oriented polyethylene terephthalate materials which are the materials generally considered to be materials of choice for laminating to metal sheet when it is desired to impart good corrosion resistance to metal sheet by virtue of the low permeability to oxygen, water and steam of such biaxially oriented polyesters.

The present invention aims to provide a process for producing a polymer/metal laminate from conventional, commercially available biaxially oriented polyester materials without havinq to use hiqh temperatures to achieve thermal lamination of the polyester to the metal sheet, with the preferred resultant laminates having properties which render them suitable for forming into cans or containers by deep drawing processes.

According to a first aspect of the present invention there is provided a process for producing by simultaneous lamination a polymer/metal/polymer laminate, which process comprises (i) simultaneously laminating to each of the major surfaces of a metal sheet a composite polyester film (A) comprising an inner layer (A1) of a substantially non-crystalline linear polyester having a softening point (Ts-A1) below 200° C. and a melting point (Tm-A1) above 150° C. and below 250° C. and an outer layer (A2) of a biaxially oriented linear polyester having a crystallinity greater than 30% and having a melting point (Tm-A2) above 250° C., the metal sheet having been heated to a temperature $T_1$ above the softening point (Ts-A1), preferably above the melting point (Tm-A1), of the polyester of inner layer (A1) thereby to cause softeninq, preferably melting, of the inner layers (A1) and adhesion thereof to the metal sheet, but below the temperature (Tm-A2) at which the outer surface of the outer layer (A2) will melt when in contact with the metal strip at temperature $T_1$, and (ii) re-heating the resultant laminate to a temperature $T_2$ sufficient to cause the polymer films (A1) to interact with and become bound to the respective surface of the metal sheet, but such that the outer surface of outer layer (A2) remains According to a second aspect of the present invention there is provided a laminated metal sheet having a polymer film adhered to each of its major surfaces, the polymer films having been adhered to the metal sheet by simultaneous thermal lamination, the polymer film adhered to each major surface of the metal sheet being a composite polyester film (A) comprising an inner layer (A1) of a substantially non-crystalline linear polyester having a softening point below 200° C. and a melting point above 150° C. but below 250° C. and an outer layer (A2) of a biaxially oriented linear polyester having a melting point above 250° C.

Preferably each composite polyester film (A) is a film which has been prepared by co-extrusion.

The lamination process of the present invention is carried out in a number of stages. In a first stage, the metal is pre-heated to a temperature $T_1$ above the softening point (Ts-A1) of the polyester of layer (A1), preferably above the melting point (Tm A1) thereof, but below the temperature (Tm A2) at which the outer surface of outer layer (A2) will melt when in contact with the metal strip at temperature $T_1$. $T_1$ is typically a temperature of from 120° to 260° C., most preferably 200° to 250° C.

In a second stage, the films and metal are brought together in a lamination nip thereby establishing intimate and uniform, wrinkle-free, contact. At this stage the contact layers are the inner layer (A1) of amorphous polyester, metal and on the opposite side of the metal, the inner layer (A1) of the other polyester film (A).

In a third stage, the resultant laminate is re-heated, preferably by induction heating the metal core to a temperature from 250° C., the temperature being chosen to be such that the outer surface of the outer layer (A2) of biaxially oriented polyester is kept below the melting point (Tm-A2) of the biaxially oriented polyester thereby to control the extent of melting in the biaxially oriented layer (A2) of the polyester film (A).

While the outer surface of the polyester film (A) is maintained below its melting point, but with the metal core above the melting point of the said polyester, rapid interaction occurs between the metal, and each of the inner polyester layers (A1). In order to achieve this interaction, the laminate is held above approximately 250° C. for 1 to 30 seconds, and thereafter the laminate is allowed to cool to a temperature of about 200° C. and then rapidly and uniformly quenched with water. By allowing the polyester layers to cool to 200° C. or below before quenching the danger of blistering of the polyester films is minimised. Furthermore, the laminate should be quenched before the polyester can recrystallise to any substantial extent. The rate of crystallisation of polyethylene terephthalate is at a maximum value at temperatures around 160° to 180° C.; accordingly, it is advisable to quench laminates formed with polyethylene terephthalate coatings at a temperature of about 200° C.

We have found that provided the outer surfaces of the biaxially oriented polyester films (A) remain below their melting points, a sufficient portion of the excellent properties of the biaxially oriented polyester film, e.g. polyethylene terephthalate, can be retained. We have also found that the residual proportion of non-crystalline (melted) and biaxially oriented (non-melted) polyester in outer layer A2 controls the tensile properties of the coating and the formability in deep drawing operations. The amount of retained biaxial orientation is inversely related to deep drawing performance and should be controlled to match the intended forming demands.

The temperature in the post lamination zone can be varied to control the properties, particularly formability, which are desired in the polyester coatings. Such control can be achieved quite readily if induction heating is used to re-heat the laminate downstream of the lamination nip. Preferably a suitable pyrometer may be used to identify the temperature of the polyester for example a single frequency device operating at 7.8 microns where polyesters have optimum emissivity. Alternatively, devices that recognise the change from biaxial orientation to crystalline non-oriented or amorphous polyester may be used to indicate the condition of the polyester film (for example, an X-ray diffractometer).

The precise temperature $T_1$ to which the metal sheet should be heated prior to lamination depends both on the thickness of the films to be laminated and also on the chemical nature of the said films. Temperatures of 140° C. to 260° C. are suitable for coextruded biaxially oriented polyethylene terephthalate.

The temperature $T_2$ to be used on re-heating the laminate downstream of the lamination nip is typically in the range 250° to 270° C.. The exact temperature to be used will depend on the dwell time before the laminate is quenched and the relative masses of film coatings and metal. Temperatures higher than 270° C. lead to complete melting of the polyethylene terephthalate films leading to loss of biaxial orientation and its associated properties. The temperature at the lower end of the said range is determined by the need to achieve a satisfactory bond strength between the metal sheet and the polymer films attached thereto in the very short time during which the laminate is heated to the required temperature. Commercial operations generally demand a dwell time of approximately two seconds only.

The metal substrate to which the polymer films are applied, typically in the form of metal strip, is generally steel or aluminium or alloys thereof, typically a steel or aluminium based product used in the packaging industry.

The gauge range is typically 0.05 mm to 0.4 mm for steel and 0.02 mm to 0.4 mm for aluminium.

The steel may be coated with tin, preferably passivated by conventional chromic treatments, or alternatively may be in the form of nickel or zinc plated steel, blackplate or phosphated blackplate, which is preferably chromate rinsed after phosphating.

The preferred steel finish is electrolytically chromium coated steel (ECCS) with a dual layer of chromium metal and chromium oxide. With such steels, the chromium metal and chromium oxide levels can vary widely. Typically, the chromium metal content ranges from 0.01 to 0.20 gm/m$^2$, while the chromium oxide ranges from 0.005 to 0.05 gm/m$^2$. The ECCS is commonly derived from deposition systems containing either sulphur containing or fluorine containing catalysts.

Each surface of the metal sheet or strip has applied thereto a composite polyester film (A) which preferably has been prepared by co-extrusion and orientation prior to application to the metal sheet or strip. The composite polyester film (A) comprises a thinner inner layer (A1) of a substantially non-crystalline polyester which has a softening point below 200° C. and a melting point above 150° C. and below 250° and a thicker outer layer (A2) which is a biaxially oriented linear polyester having a crystallinity greater than 30% and a melting point above 250° C.

Preferably the highly crystalline outer layer (A2) is polyethylene terephthalate. Preferably the inner layer (A1) is a linear copolyester, for example an amorphous copolymer of approximately 80 mole % ethylene terephthalate and approximately 20 mole % ethyleneisophthalate. Copolyesters of terephthalic acid and two alcohols, for example ethylene glycol and cyclohexanedimethanol, are also suitable for use as the inner layer (A1).

Typically, the biaxially oriented polyester in outer layer (A2) has a crystallinity greater than 30%, preferably from 40 to 50%.

The crystallinity of a polyester resin can be measured by x-ray diffraction techniques as described in GB 1566422 or from measurement of density, and applying the following relationship:

$$V_c = (P - P_a) \cdot (P_c - P_a)^{-1}$$

wherein $V_c$ = volume fraction crystallinity
$P$ = density of sample
$P_a$ = density of amorphous material
$P_c$ = density of crystalline material P can be measured in a density column, using zinc chloride/water or n-heptane/carbon tetrachloride mixtures.

The biaxially oriented polyester film used as the outer layer may have a range of orientation levels and may be formed by stretching the amorphous extruded polymer in the forward direction at temperatures above the glass transition temperature of the polymer by a factor of 2.2 to 3.8 and similarly in the transverse direction by 2.2 to 4.2, typically 2.2×2.2 up to 3.0×3.0. Where the laminated coating is to be used in deep drawing metal containers, the orientation is preferably limited to stretching by a factor approximately 2.5 in both forward and transverse directions.

The heat setting temperature is typically 200° to 220° C. preferably 210° to 220° C. Lower heat setting temperatures generally result in an increased tendency for the oriented film to shrink when reheated.

Typically the inner layer (A1) should be continuous and have a typical thickness of about 2 to 3 microns. The ratio of the thickness of the outer polyester layer (A2) to the inner polyester layer (A1) is preferably 12 to 3, with the total thickness of the combined layers being preferably from 12 to 25 microns.

If desired, one or more of the polyester layers may contain an inorganic anti-blocking agent such as synthetic silica having a particle size of from 0.5 to 5 microns.

The outer polyester layer (A2) may optionally contain a proportion, typically 0.5 to 10% by weight, of the polyester used in layer (A1). This material may be derived by adding co-extruded film edge trim to the PET extruder during film manufacture. The presence of this additional polyester improves the formability of the polyester film.

Also, if desired, the outer polyester layer (A2) may be pigmented using conventional pigments such as titanium dioxide.

The principal function of the inner polyester layer (A1) is to heat seal to the metal surface at temperatures below the melting point of the outer crystalline polyester layer (A2).

It is important that this layer should retain its amorphous nature after orientation and heat setting of the film if the inner layer is to bond below its melting point.

Particularly preferred aspects of the present invention are the use of metal temperature before film application in the range 200° C. to 250° C., the use of biaxially oriented polyethylene terephthalate films with an orientation induced by stretching in both directions by a factor of approximately 2.2 by 2.2 to 3.0 by 3.0, and the use of induction heating to reheat the laminate after film application and control the extent of melting in the biaxially oriented portion of the coating (A2).

Throughout this specification, intrinsic viscosities are measured at 25° C. in o-chlorophenol solutions at a concentration of 5 g/l.

BRIEF DESCRIPTION OF THE DRAWINGS

FIGS. 2 to 8 illustrate the shapes of typical products which can be obtained from laminates of the present invention, such as easy open or non-easy open food can ends, draw-redraw and partial wall ironed cans, easy open beverage can ends, aerosol caps, aerosol cones, and aerosol domes;

FIGS. 9 and 10 schematically illustrate a process for preparing polymer/metal/polymer laminates according to the present invention; and FIG. 11 schematically shows a temperature profile for the process of FIG. 9.

Figure 1:
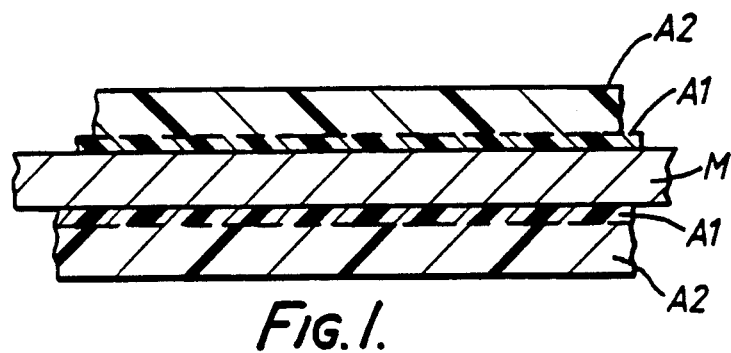
FIG. 1 is a diagrammatic sectional view of a laminated metal sheet prepared in accordance with the present invention.
Figure 2:
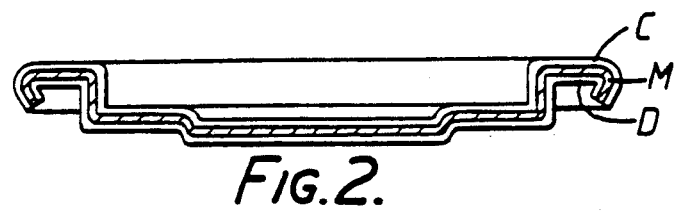
Figure 3:
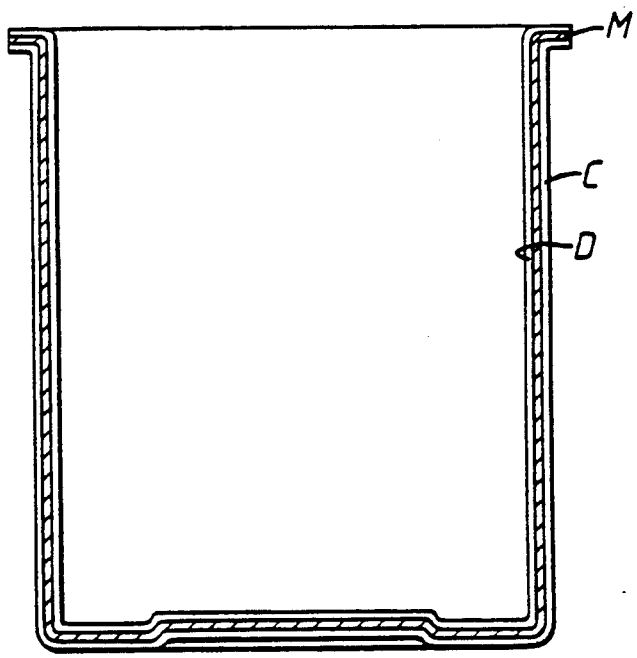

The following examples are now given by way of further illustration of the present invention.

EXAMPLES 1 and 2 (Comparative)

Laminates of biaxially oriented polyethylene terephthalate film laminated to each side of an ECCS metal strip were prepared in accordance--with the teaching of GB 2123746. Details of the materials used to prepare the laminates are given in Table 1. The performance of these laminates when used to prepare cans or can ends is shown in Table 3 (Examples 6 and 7).

EXAMPLES 3 to 5

Polymer/metal/polymer laminates were prepared by a lamination process performed in apparatus as illustrated schematically in FIG. 9 or FIG. 10 of the accompanying drawings. A metal sheet M was pre-heated to an appropriate temperature $T_1$ by a heater 1. Temperature $T_1$ is usually within the range 120° to 260° C. Polyester films A were fed from feed rolls 2 and 4 and laminated to the opposite sides of the pre-heated metal sheet between lamination rolls 6, 8, typically having a diameter of 100–400 mm. Lamination was generally performed using a nip force of 200–400N per metre between the lamination rolls.

In the lamination nip, intimate and uniform, wrinkle-free contact between the metal sheet and the polymer films is established. Downstream of the lamination rolls the resultant laminate is re-heated, preferably by use of an induction heater 10, to a temperature $T_2$ at which the polymer films (A) will interact with and become bound to the metal sheet. Temperature $T_2$ is usually within the range 250 to 270° C. The metal polymer laminate is held at temperature $T_2$ or a temperature below $T_2$ (typically above 200° C.) for a short period of time, usually no more than 2 seconds, and is then rapidly and uniformly quenched with water to a temperature below the glass transition point of the polyester in films (A). Quenching can be performed in any conventional manner, but typically can be performed by passing the laminate through a tank 12 of water as shown in FIG. 9 or by passing the laminates through curtian 14 of quenching water as shown in FIG. 10.

In general, the process illustrated in FIG. 9 with the lamination being performed in a vertical mode is preferred. Vertical movement of the metal strip through the lamination stage tends to allow a higher quench rate and gives better and more uniform quenching.

FIG. 11 also shows a schematic diagram of a typical temperature profile which would be found in the process illustrated in the apparatus of FIG. 9.

Table 1 sets out the types of polymer which were laminated to the metal strip and the thickness of each layer. Examples 1 and 2 are given by way of comparison. These laminates were obtained by a process such as that described in GB 2123746. Laminates of the types described in Examples 3 to 5 were obtained by a process in accordance with the present invention performed under the conditions set out in Table 2.

A diagrammatic sectional view of a laminated metal sheet prepared in accordance with the process of the present invention is given in FIG. 1 of the accompanying drawings.

TABLE 1

COMPOSITION OF METAL POLYMER LAMINATES

| EXAMPLE | LAYER A2 | LAYER A1 | METAL | LAYER A1 | LAYER A2 |
|---|---|---|---|---|---|
| 1 | Biaxial PET (I) (12μ) | — | | — | Biaxial PET (I) (12μ) |
| 2 | Biaxial PET (I) (16μ) | — | ECCS | — | Biaxial PET (I) (16μ) |
| 3 | Biaxial PET (I) (12μ) | Polyester A (3μ) | METAL STRIP | Polyester A (3μ) | Biaxial PET (I) (12μ) |
| 4 | Biaxial PET (II) (12μ) | Polyester A (3μ) | | Polyester A (3μ) | Biaxial PET (II) (12μ) |
| 5 | Biaxial PET (III) (12μ) | Polyester A (3μ) | | Polyester A (3μ) | Biaxial PET (III) (12μ) |

| KEY TO TABLE 1 | |
|---|---|
| Metal | ECCS of thickness 0.21 mm for can ends, and of thickness 0.18 mm for drawn cans. |
| Polyester A | In Examples 3 to 5, the polyester of inner layer (A1) was a non-crystalline (i.e. amorphous) polyester which was a copolymer of ethylene terephthalate (approx. 80 mole %) and ethylene isophthalate (approx. 20 mole %). The softening point of the polyester was approximately 140° C., and the melting point of the polyester was 210° C. The intrinsic viscosity of the polyester was from 0.6 to 0.7. |
| Biaxial PET (I) | represents a biaxially oriented polyethylene terephthalate having an orientation of approximately 3.2 by 3.2, a crystallinity of approximately 50%, and a melting point of approximately 260° C. |
| Biaxial PET (II) | represents a biaxially oriented polyethylene terephthalate having an orientation of approximately 2.5 by 2.5, a crystallinity of approximately 45%, and a melting point of approximately 260° C. |
| Biaxial PET (III) | represents a biaxially oriented polyethylene terephthalate incorporating 5% of an 80:20 mole % copolymer of ethylene terephthalate and ethylene isophthalate. The polymer has an orientation of approximately 3.2 by 3.2, a crystallinity of approximately 50%, and a melting point of approximately 260° C. |

TABLE 2

| | | | Laminate Reheating | | Laminate XRD | |
|---|---|---|---|---|---|---|
| Example | Film Type | Metal Temperature $T_1$ (°C.) | Technique | Approximate Temperature $T_2$ (°C.) | Relative Peak Ht | Actual Ht |
| 6 | As Ex. 1 | 280 | — | — | 0.3 | 2000 |
| 7 | As Ex. 2 | 280 | — | — | 0.4 | 2400 |
| 8 | As Ex. 3 | 150 | Induction | 240 | 0.7 | 5000 |
| 9 | As Ex. 3 | 150 | Induction | 255 | 0.2 | 1400 |
| 10 | As Ex. 3 | 220 | Induction | 255 | 0.2 | 1400 |
| 11 | As Ex. 4 | 220 | Induction | 240 | 0.6 | 4200 |
| 12 | As Ex. 4 | 220 | Induction | 255 | 0.2 | 1400 |
| 13 | As Ex. 4 | 150 | Induction | 255 | 0.2 | 1400 |

TABLE 2-continued

| | | Metal Temperature | Laminate Reheating | | Laminate XRD | |
|---|---|---|---|---|---|---|
| Example | Film Type | $T_1$ (°C.) | Technique | Approximate Temperature $T_2$ (°C.) | Relative Peak Ht | Actual Ht |
| 14 | As Ex. 5 | 220 | Induction | 255 | — | — |
| 15 | As Ex. 3 | 220 | Infra-red | 270 | 0.1 | 700 |

The metal/polymer laminates of Examples 6 to 15 were formed into various components for containers and closures such as draw-redraw cans and aerosol can ends or beverage can ends. Illustrations of the shapes of typical products which can be obtained from the metal/polymer laminates of the invention are illustrated in FIGS. 2 to 8 of the accompanying drawings which illustrate easy-open food can ends or non-easy open food can ends, draw redraw and partial wall ironed cans, easy open beverage can ends, aerosol cups, aerosol cones and aerosol domes.

The performance of the laminates of Examples 6 to 15 after having been formed into a shaped product such as a draw-redraw can or an aerosol/beverage can end was ascertained by subjecting the products to various tests. The results are shown in Table 3.

Behaviour during forming

The polyethylene terephthalate coating coverage was monitored as the laminate was formed into food cans (65 mm diameter, 100 mm height draw-redraw cans), aerosol can end components and beverage can ends. Coverage was assessed visually and by immersion in acidifed copper for two minutes, followed by inspection for copper deposited at areas of exposed metal. The results are shown in the two columns headed "Forming" in Table 3.

Behaviour during retorting

Cans formed from the laminates were filled with citric acid (0.65%), sodium chloride (1.0%) and malic acid (0.42%) solution at pH 4.3, a top end was seamed on to the can and retorted at 121° C. for 1 hour. The can was cooled, opened and the condition of the polymer film was inspected. The results are shown in the column headed "Retorting" in Table 3.

XRD Relative Peak Height (see Table 2)

The biaxially oriented films or laminate were placed in an x-ray diffractometer. Count rates were measured when the flat samples were exposed to a beam of substantially monochromatic x-rays, using an appropriate detector. The sample and detector were rotated in-line, with respect to the beam, maintaining the geometry such that the angle between sample and beam ($\theta$) and detector and beam remained in the ratio 1:2, as in a normal powder diffraction scan. This arrangement generates information on planes parallel to the sample surface.

In biaxially oriented PET, the (1,0,0) plane gives a high count rate at $\theta = 13°$ but in amorphous PET this peak is absent. The ratio of $\theta = 13°$ peak heights for laminate and original film is related to the amount of retained orientation. The Relative XRD Peak Height (Table 2) is the ratio of count rates for the laminated PET coating and the corresponding free film at $\theta = 13°$.

The results given in Table 3 show that laminates in accordance with the present invention can be used satisfactorily both for shallow drawn components as well as deep drawn components (see Examples 8 to 15).

Laminates prepared under preferred processing conditions of the process of the present invention as exemplified by Examples 10, 12 and 14 will readily form shallow drawn components having acceptable properties as well as deep drawn components which do not exhibit loss of corrosion protection. In contrast, the laminated polyesters of the prior art GB 2123746 as exemplified by Examples 6 and 7 fail when the laminate is severely drawn. The polyester of GB 2123746 have a limited elongation at break, and this is readily exceeded when forming deep drawn cans with the result that the polyester coating breaks and protection of the metal sheet against corrosion is lost.

Examples 10, 12 and 14 in Tables 2 and 3 illustrate preferred processing conditions in accordance with the present invention. A comparison of the properties of the laminates obtained in these Examples with the properties of the laminates obtained in Examples 9 and 13 show that use of a metal temperature prior to lamination as low as 150° C. can result in poor adhesion of the polyester film to the metal sheet after forming and retorting. The preferred metal temperature before application of the film thereto is from 200°-250° C., below the melting point of the PET in outer layer (A2).

Example 15 illustrates that if the conditions (e.g. temperature) on re-heating are so high as to cause the polyester coating to melt completely, the coating becomes opaque on retorting and is regarded as unacceptable.

TABLE 3

| | Laminate Performance | | Aerosol/Beverage Can End |
|---|---|---|---|
| | Draw Redraw Cans | | |
| Example | Forming | Retorting | Forming |
| 6 | Coating crazing at top of can wall | Corrosion at areas of coating crazing | Satisfactory |
| 7 | Coating crazing at top of can wall | Corrosion at areas of coating crazing | Satisfactory |
| 8 | Coating crazing at top of can wall | Corrosion at areas and coating detachment from can base | Satisfactory |
| 9 | Satisfactory | Coating detachment from can base | Satisfactory |
| 10 | Satisfactory | Satisfactory | Satisfactory |
| 11 | Slight coating crazing at top of can wall | Slight corrosion at areas of coating crazing | Satisfactory |
| 12 | Satisfactory | Satisfactory | Satisfactory |

TABLE 3-continued

| | Laminate Performance | | Aerosol/Beverage Can End |
| | Draw Redraw Cans | | |
| Example | Forming | Retorting | Forming |
| --- | --- | --- | --- |
| 13 | Satisfactory | Coating detachment from can base | Satisfactory |
| 14 | Satisfactory | Satisfactory | — |
| 15 | Satisfactory | Blushing | Satisfactory |

We claim:

1. A container or a component for a container formed from a laminated metal sheet having a polymer film adhered to each of its major surfaces, the polymer films having been adhered to the metal sheet by simultaneous thermal lamination, the polymer film adhered to each major surface of the metal sheet being a composite polyester film (A) comprising an inner layer (A1) of a substantially non-crystalline linear polyester having a softening point below 200° C. and a melting point above 150° C. but below 250° C. and an outer layer (A2) of a biaxially oriented linear polyester having a melting point above 250° C.

2. A laminated metal sheet having a polymer film adhered to each of its major surfaces, the polymer films having been adhered to the metal sheet by simultaneous thermal lamination, the polymer film adhered to each major surface of the metal sheet being a composite polyester film (A) comprising an inner layer (A1) of a substantially non-crystalline linear polyester having a softening point below 200° C. and a melting point above 150° C. but below 250° C. and an outer layer (A2) of a biaxially oriented linear polyester having a melting point above 250° C.

3. A laminated metal sheet according to claim 2, wherein the outer layer (A2) is biaxially oriented polyethylene terephthalate.

4. A laminated metal sheet according to claim 2, wherein the metal sheet is electrolytically chromium coated steel with a dual layer of chromium metal and chromium oxide.

5. A laminated metal sheet according to claim 2, wherein the polyester of inner layer (A1) is a copolymer of ethylene terephthalate and ethylene isophthalate, or a copolymer formed from terephthalic acid and two alcohols.

6. A laminated metal sheet according to claim 5, wherein the mole ratio of ethylene terephthalate to ethylene isophthalate is 80:20.

7. A laminated metal sheet according to claim 5, wherein the polyester of inner layer (A1) is a copolymer formed from teraphthalic acid, ethylene glycol and cyclohexanedimethanol.

8. A process for producing by simultaneous lamination a polymer/metal/polymer laminate, which process comprises
 (i) simultaneously laminating to each of the major surfaces of a metal sheet a composite polyester film (A) comprising an inner layer (A1) of a substantially non-crystalline linear polyester having a softenign point (Ts-A1) below 200° C. and a melting point (Tm-A1) above 150° C. and below 250° C. and an outer layer (A2) of a biaxially oriented linear polyester having a crystallinity greater than 30% and having a melting point (Tm-A2) above 250° C., the metal sheet having been heated to a temperature $T_1$ above the softening point (Ts-A1), of the polyester of inner layer (A1) thereby to cause softening of the inner layer (A1) and adhesion thereof to the metal sheet, but below the temperature (Tm-A2) at which the outer surface of the outer layer (A2) will melt when in contact with the metal strip at temperature $T_1$, and
 (ii) re-heating the resultant laminate to a temperature $T_2$ sufficient to cause the polymer film (A1) to interact with and become bound to the respective surface of the metal sheet, but such that the outer surface of the outer layer (A2) remains below temperature (Tm-A2).

9. A process according to claim 8, wherein the laminate is reheated by induction heating means.

10. A process according to claim 8, wherein the metal sheet is electrolytically chromium coated steel with a dual layer of chromium metal and chromium oxide.

11. A process according to claim 8, wherein temperature $T_1$ to which the metal sheet is heated is above the melting point (Tm-A1) of the polyester inner layer (A1) thereby to cause melting of the inner layers (A1) and said adhesion thereof to the metal sheet.

12. A process according to claim 8, wherein the temperature $T_1$ is from 120° to 260° C. and the temperature $T_2$ is higher than $T_1$.

13. A process according to claim 8, wherein the temperature $T_1$ is from 120° to 260° C.

14. A process according to claim 13, wherein the temperature $T_1$ is from 200° to 250° C.

15. A process according to claim 8, wherein the temperature $T_2$ is from 250° to 270° C.

16. A process according to claim 15, wherein the laminate is heated to a temperature in the range 250° to 270° C. and then held above 200° C. for at least 1 second before being quenched.

17. A process according to claim 16, wherein the laminate is heated to a temperature of 250° C., and then held above 240° C. for 2 seconds before being quenched.

18. A process according to claim 16, wherein the laminate is quenched rapidly and uniformly.

19. A process according to claim 18, wherein the laminate is quenched rapidly and uniformly by immersion in a tank of water or by line quenching with water.

20. A process according to claim 8, wherein the polyester of inner layer (A1) is a copolymer of ethylene terephthalate and ethylene isophthalate, or a copolymer formed from terephthalic acid and two alcohols.

21. A process according to claim 20, wherein the mole ratio of ethylene terephthalate to ethylene isophthalate is 80:20.

22. A process according to claim 20, wherein polyester of inner layer (A1) is a copolymer formed from teraphthalic acid, ethylene glycol and cyclohexanedimethanol.

23. A process according to claim 8, wherein the outer layer (A2) is biaxially oriented polyethylene terephthalate.

24. A process according to claim 23, wherein the polyester film of outer layer (A2) has a crystallinity of from 40 to 50%.

* * * * *